US012043390B2

(12) United States Patent
Marutzky

(10) Patent No.: US 12,043,390 B2
(45) Date of Patent: Jul. 23, 2024

(54) CABIN ATTENDANT AIRCRAFT SEAT LEG REST WITH FOOT SUPPORT

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 385 days.

(21) Appl. No.: 17/379,515

(22) Filed: Jul. 19, 2021

(65) Prior Publication Data
US 2023/0018063 A1 Jan. 19, 2023

(51) Int. Cl.
B64C 11/06 (2006.01)
B64D 11/06 (2006.01)
(52) U.S. Cl.
CPC ........ B64D 11/0643 (2014.12); B64D 11/064 (2014.12); B64D 11/0691 (2014.12)
(58) Field of Classification Search
CPC .............. B64D 11/064; B64D 11/0643; B64D 11/0691; B64D 11/0698; B60N 3/06; B60N 3/063; A47C 7/5062; A47C 7/50; A47C 7/506
USPC ...................................................... 297/423.2
See application file for complete search history.

(56) References Cited

U.S. PATENT DOCUMENTS

| 4,799,632 | A | 1/1989 | Baymak et al. |
| 5,447,359 | A | 9/1995 | Asbjornsen et al. |
| 6,267,445 | B1 | 7/2001 | Marais |
| 6,588,839 | B1 | 7/2003 | Salzer |
| 8,444,225 | B2 | 5/2013 | Behe |
| 8,444,226 | B2 * | 5/2013 | Driessen ............ B64D 11/0643 297/423.3 |
| 9,446,849 | B1 * | 9/2016 | Pinkal .................. B60N 2/3015 |

(Continued)

FOREIGN PATENT DOCUMENTS

| GB | 214547 A | 4/1924 |
| GB | 201720854 | 1/2018 |

OTHER PUBLICATIONS

Extended European Search Report in European Application No. 22183344.5 dated Nov. 28, 2022, 8 pages.

*Primary Examiner* — Christopher D Hutchens
*Assistant Examiner* — Michael A. Fabula
(74) *Attorney, Agent, or Firm* — Suiter Swantz IP

(57) ABSTRACT

A leg rest assembly is disclosed. The assembly may include a support sub-assembly configured to provide at least one of leg support or foot support. The support sub-assembly may include a panel and a support cushion. The support cushion may include a cavity defined by one or more surfaces of the support cushion. The assembly may include a translation sub-assembly configured to translate the support sub-assembly. The translation sub-assembly may include one or more translation arms. The translation sub-assembly may include one or more guide rails. The translation sub-assembly may include one or more linear bearings configured to engage with the one or more guide rails, the one or more linear bears slideable along a length of the one or more guide rails. The translation sub-assembly may include one or more translation devices configured to translate the support sub-assembly between a first position and one or more additional positions.

14 Claims, 8 Drawing Sheets

(56) References Cited

U.S. PATENT DOCUMENTS

| | | | | |
|---|---|---|---|---|
| 10,631,652 B2* | 4/2020 | Mackert | ............... | A47C 7/5062 |
| 10,638,847 B2* | 5/2020 | Mackert | ............... | A47C 7/5068 |
| 2003/0189360 A1* | 10/2003 | Laurent | .............. | B64D 11/0641 |
| | | | | 297/83 |
| 2003/0209933 A1* | 11/2003 | Flory | .................... | B60N 3/063 |
| | | | | 297/423.36 |
| 2004/0026964 A1* | 2/2004 | Edrich | ................... | B60N 2/181 |
| | | | | 297/61 |
| 2004/0036336 A1* | 2/2004 | Veneruso | ........... | B64D 11/0641 |
| | | | | 297/184.14 |
| 2005/0173963 A1* | 8/2005 | Edrich | .................... | B60N 2/62 |
| | | | | 297/423.28 |
| 2006/0186721 A1* | 8/2006 | Flory | .................... | B60N 2/995 |
| | | | | 297/423.36 |
| 2010/0244534 A1* | 9/2010 | Driessen | ................ | B60N 2/995 |
| | | | | 297/423.35 |
| 2011/0240797 A1* | 10/2011 | Behe | ...................... | B64D 11/06 |
| | | | | 297/423.35 |
| 2014/0166808 A1* | 6/2014 | Boenning | .......... | B64D 11/0698 |
| | | | | 244/118.6 |
| 2018/0111692 A1* | 4/2018 | Pacheco | ............. | B64D 11/0691 |
| 2018/0170552 A1* | 6/2018 | Kirkley | .............. | B64D 11/0698 |
| 2018/0178915 A1* | 6/2018 | Ward | ..................... | A47C 7/506 |
| 2020/0262561 A1* | 8/2020 | Verny | ................ | B64D 11/0641 |
| 2021/0155137 A1 | 5/2021 | Line et al. | | |
| 2022/0194594 A1* | 6/2022 | Acharya | ............ | B64D 11/0627 |
| 2022/0242575 A1* | 8/2022 | Marutzky | ............ | B64D 11/064 |

* cited by examiner

CABIN ATTENDANT AIRCRAFT SEAT LEG REST WITH FOOT SUPPORT

BACKGROUND

Aircraft may include crew rest facilities for cabin attendants to use during rest periods. The crew rest facilities may need to be configured in accordance with aviation guidelines and/or standards.

SUMMARY

A cabin attendant aircraft seat is disclosed, in accordance with one or more embodiments of the present disclosure. The aircraft seat includes a support system including a seatback frame and a seat pan frame. The aircraft seat includes a seat pan cover including at least one surface configured to conform to a corresponding surface of the support system. The aircraft seat includes a seatback cover including at least one surface configured to conform to a corresponding surface of the support system. The aircraft seat includes a leg rest with foot support assembly configured to couple to a portion of the seat pan frame. The leg rest with foot support assembly includes a support sub-assembly configured to provide at least one of leg support or foot support. The support sub-assembly includes a panel. The support sub-assembly includes a support cushion, the support cushion configured to couple to a portion of the panel, the support cushion including a cavity defined by one or more surfaces of the support cushion. The leg rest with foot support assembly includes a translation sub-assembly configured to translate the leg rest with foot support assembly between a first position and one or more additional positions. The translation sub-assembly includes one or more translation arms configured to couple to one or more portions of the support sub-assembly, the one or more translation arms further configured to couple to one or more portions of the seat pan frame. The translation sub-assembly includes one or more guide rails configured to couple to the one or more translation arms. The translation sub-assembly includes one or more linear bearings configured to engage with the one or more guide rails, the one or more linear bearings slideable along a length of the one or more guide rails. The translation sub-assembly includes one or more translation devices configured to translate the support sub-assembly between the first position and the one or more additional positions when the one or more linear bearings slide along the length of the one or more guide rails.

In some embodiments, the panel may include one or more flanges, the one or more flanges may be configured to couple to one or more portions of the support cushion to align the support cushion with the panel.

In some embodiments, the support sub-assembly may further include one or more side caps.

In some embodiments, at least one of the one or more surfaces of the support cushion may be angled.

In some embodiments, the support sub-assembly may further include a rub strip configured to reversibly couple to a portion of the support cushion.

In some embodiments, the one or more translation devices may include one or more bungee cords.

In some embodiments, the translation sub-assembly may further include a plurality of bungee clamps configured to couple the one or more bungee cords to the leg rest with foot support assembly.

In some embodiments, the plurality of bungee clamps may include a first set of one or more bungee cords configured to couple the one or more bungee cords to one or more portions of the support sub-assembly, the plurality of bungee clamps may further include a second set of one or more bungee cords configured to couple the one or more bungee cords to one or more portions of the translation sub-assembly.

In some embodiments, the one or more guide rails may include one or more travel limiters, the one or more travel limiters may be configured to prevent the one or more linear bearings from disengaging with the one or more guide rails.

In some embodiments, the one or more translation devices may be configured to stow the leg rest in the first position, the first position including an un-extended position.

In some embodiments, the cavity of the support cushion may be configured to receive a portion of a user's foot.

In some embodiments, the support sub-assembly may be configured to translate between the first position and the one or more additional positions when pressure is applied by the user's foot in a direction outward from the cavity of the support cushion.

In some embodiments, the first position may include an un-extended position, the one or more additional positions may include one of an extended position or one or more intermediate positions.

In some embodiments, the support sub-assembly may be configured to automatically retract to the first position when pressure is released from the cavity of the support cushion, the first position including an un-extended position A leg rest with foot support assembly is disclosed, in accordance with one or more embodiments of the present disclosure. The leg rest with foot support assembly includes a support sub-assembly configured to provide at least one of leg support or foot support. The support sub-assembly includes a panel. The support sub-assembly includes a support cushion, the support cushion configured to couple to a portion of the panel, the support cushion including a cavity defined by one or more surfaces of the support cushion. The leg rest with foot support assembly includes a translation sub-assembly configured to translate the support sub-assembly between a first position and one or more additional positions. The translation sub-assembly includes one or more translation arms configured to couple to one or more portions of the support sub-assembly, the one or more translation arms further configured to couple to one or more portions of a seat pan frame of an aircraft seat. The translation sub-assembly includes one or more guide rails configured to couple to the one or more translation arms. The translation sub-assembly includes one or more linear bearings configured to engage with the one or more guide rails, the one or more linear bears slideable along a length of the one or more guide rails. The translation sub-assembly includes one or more translation devices configured to translate the support sub-assembly between the first position and the one or more additional positions when the one or more linear bearings slide along the length of the one or more guide rails.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
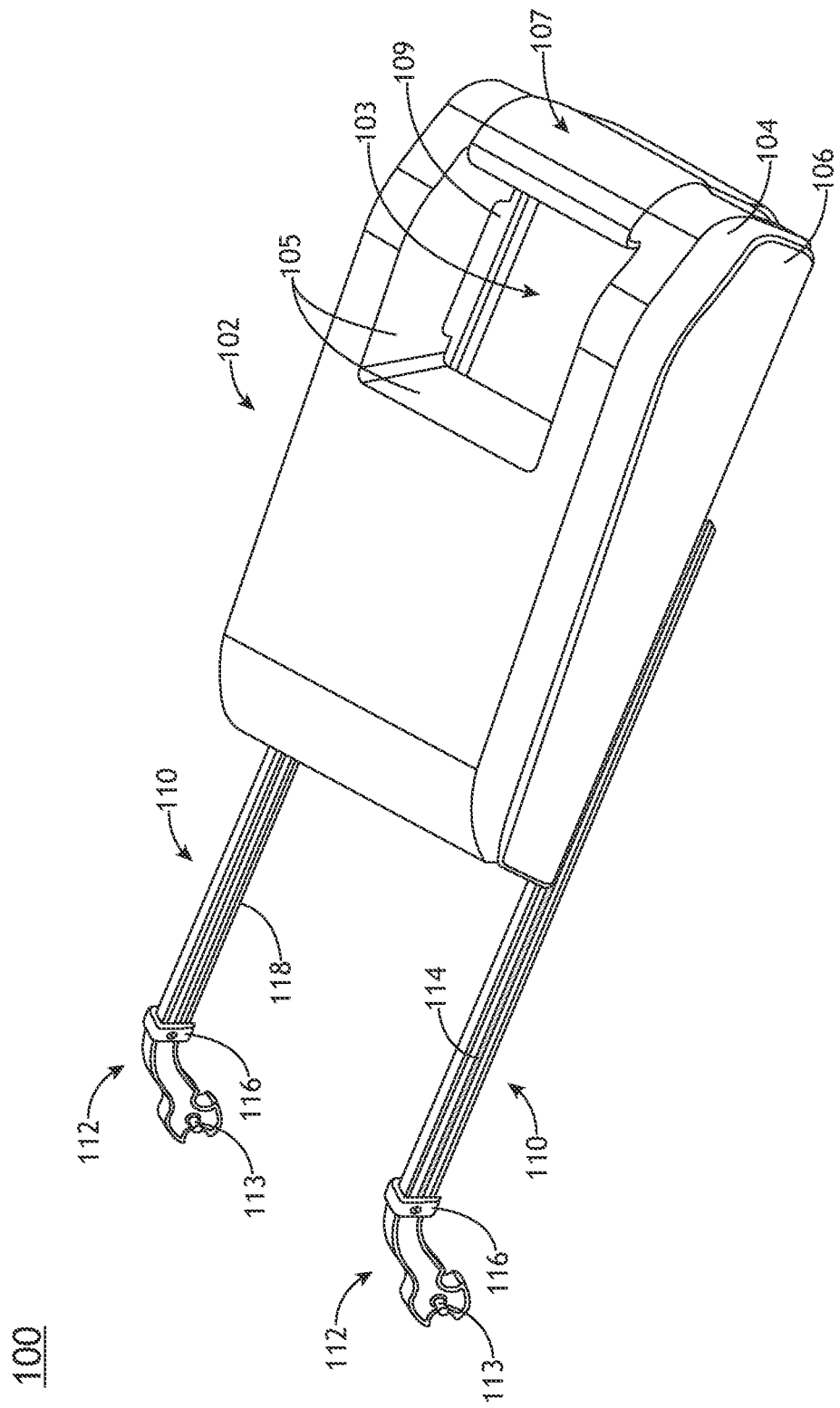
FIG. 1A illustrates a top perspective view of a cabin attendant aircraft seat leg rest with foot support, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-3B in general illustrate a leg rest with foot support for a cabin attendant aircraft seat, in accordance with one or more embodiments of the disclosure.

Aircraft may include crew rest facilities for cabin attendants to use during rest periods. The crew rest facilities may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, the crew rest facilities should include a cabin attendant seat that allows for a flat or near flat sleep position. By way of another example, the crew rest facilities should include a cabin attendant seat that reclines at least 40 degrees and provides leg and foot support.

As such, it would be desirable to provide a leg rest with foot support for a cabin attendant aircraft seat. The cabin attendant aircraft seat including the leg rest with foot support should meet aviation guidelines and/or standards. The leg rest with foot support should provide a leg and foot support for a variety of body sizes (e.g., gender, height, weight, or the like). The leg rest with foot support should provide multi-position leg and foot support that is natural and intuitive. The leg rest with foot support should require minimal operational training. The leg rest with foot support should be configured to auto-retract to the un-extended position to prevent the cabin attendant aircraft seat from becoming damaged.

FIGS. 1A-2D illustrate perspective views of the leg rest with foot support assembly 100, in accordance with one or more embodiments of the disclosure. It is noted "leg rest with foot support assembly 100" and variants of the term including, but not limited to, "leg rest assembly 100" or "assembly 100" may be considered equivalent, for purposes of the disclosure.

The leg rest assembly 100 may include a leg and/or foot support sub-assembly 102. It is noted "leg and/or foot support sub-assembly 102" and variants of the term including, but not limited to, "support assembly 102" or "sub-assembly 102" may be considered equivalent, for purposes of the disclosure.

The support sub-assembly 102 may include, but is not limited to, a support cushion 104, one or more side caps 106, and a panel 108. For example, the support cushion 104 may be coupled to the panel 108 via one or more fastening mechanisms (e.g., hook-and-loop fasteners, snaps, adhesives, or the like). The panel 108 may include one or more flanges 109 configured to align the support cushion 104 with the panel 108 and provide stabilization for the support cushion 104 (e.g., to prevent the cushion 104 from wobbling). For instance, the panel 108 may include one or more flanges 109 configured to couple to the one or more surfaces 105 of the support cushion 104.

The one or more side caps 106 may be configured to visually hide the fastening mechanism of the support cushion 104 and the panel 108. For example, a left side cap 106 may be configured to visually hide a left portion of the support cushion 104 where the support cushion 104 couples to the panel 108 and a right side cap 106 may be configured to visually hide a right portion of the support cushion 104 where the support cushion 104 couples to the panel 108.

The support cushion 104 may include a cavity 103 defined by one or more surfaces 105 of the support cushion 104. For example, as shown in FIGS. 2B and 2D, the cavity 103 may be configured to provide foot support for the user (e.g., cabin attendant). For instance, the cavity 103 may be dimensioned to receive a portion of a user's foot, such that the cavity 103 may provide foot support for the user (e.g., cabin attendant). It is noted that the cavity 103 may be any shape and/or size suitable for receiving a portion of a user's foot to provide foot support for the user.

Referring to FIGS. 2B and 2D, at least one surface 105 of the support cushion 104 may be angled. For example, the at least one surface 105 of the support cushion 104 may be angled to remove pressure from the back of a user's ankle and/or foot. In this regard, the cavity 103 may be configured to naturally accommodate a user's foot.

Further, as discussed further herein with respect to FIGS. 2A-2D, the cavity 103 may be configured to aid a user in translating the support sub-assembly 102 by allowing a user to place their foot/feet in the cavity 103 and extend their legs to translate the support sub-assembly 102. In this regard, as the user extends their legs, the support sub-assembly 102 may translate. Further, when a user removes their foot/feet from the cavity 103, the support sub-assembly 102 may auto-retract (i.e. release). It is noted that the cavity 103 may prevent a user from having to bend over to manually extend the leg rest assembly 100.

The support cushion 104 may include a rub strip 107. For example, the rub strip 107 may be configured to reversibly couple to a portion of the support cushion 104 where a user's foot/feet may rub. For instance, the rub strip 107 may be removed and/or replaced if the rub strip becomes damaged or dirty. In this regard, the entire support cushion 104 does not have to be removed and/or replaced.

It is noted that the support cushion 104 may be formed of any material known in the art suitable for supporting a user's legs and/or feet. For example, the support cushion 104 may be formed of a foam. Further, it is noted that the support cushion 104 may be covered by any material known in the art including, but not limited to, leather, faux leather, fabric, or the like.

The leg rest assembly 100 may include one or more translation arms 110. For example, the leg rest assembly 100 may include a first translation arm 110 and a second translation arm 110, where the first translation arm 110 and the second translation arm are configured to couple to one or more portions of the support sub-assembly 102.

Figure 3A:
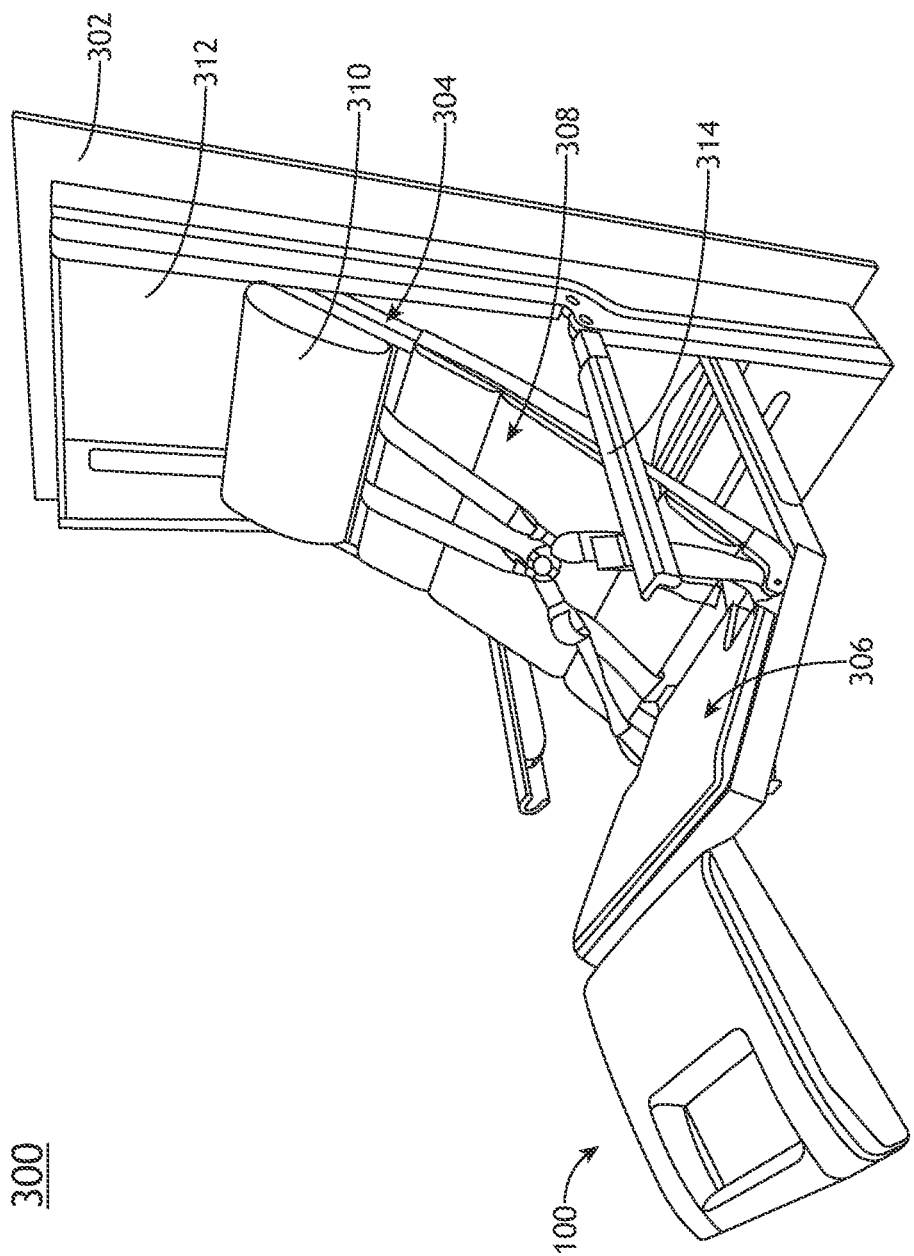
FIG. 3A illustrates a perspective view of a cabin attendant aircraft seat assembly including the cabin attendant aircraft seat leg rest with foot support, in accordance with one or more embodiments of the disclosure.
Figure 3B:
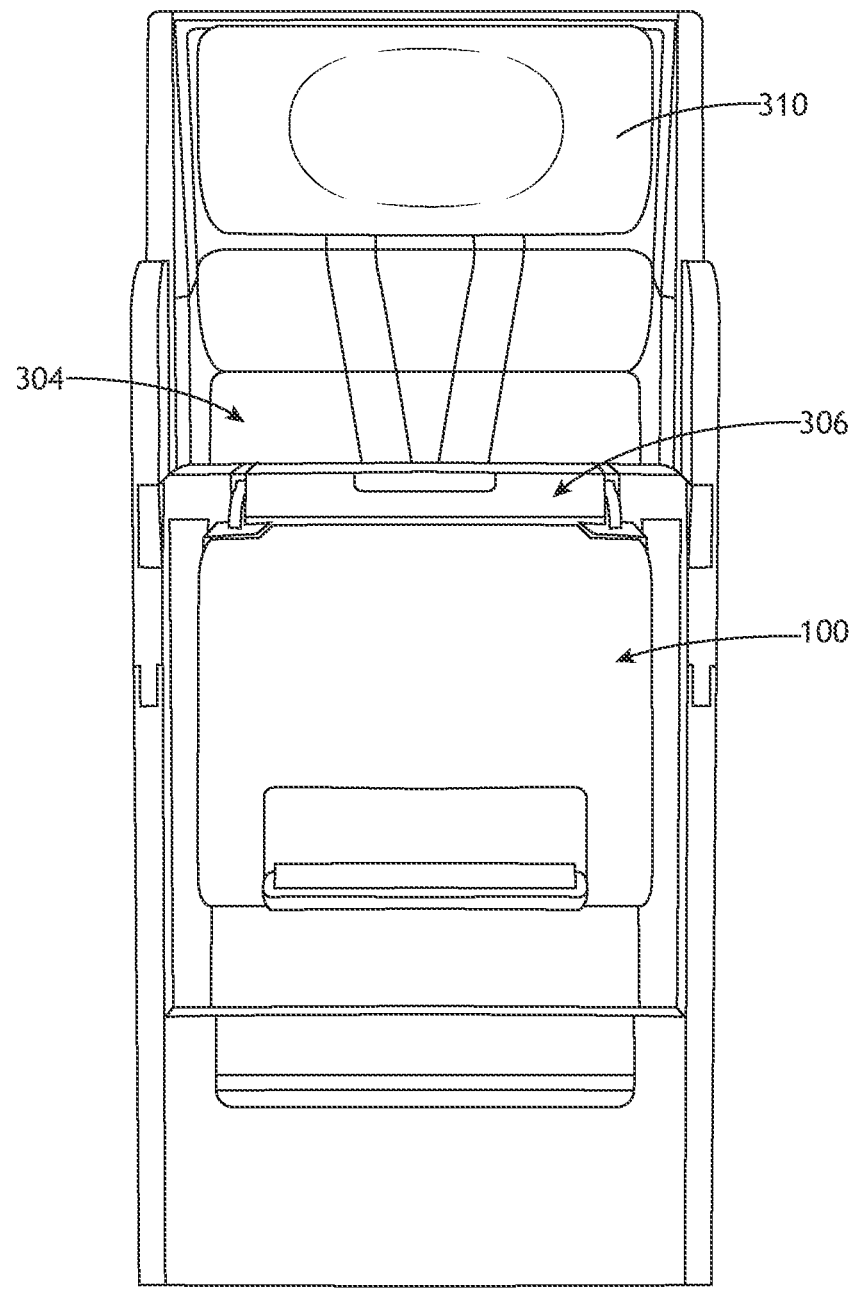
FIG. 3B illustrates a perspective view of the cabin attendant aircraft seat assembly including the cabin attendant aircraft seat leg rest with foot support in a stowed position, in accordance with one or more embodiments of the disclosure.

The one or more translation arms 110 may be configured to couple to a seat pan of a cabin attendant aircraft seat (as shown in FIGS. 3A-3B). For example, the one or more translation arms 110 may be configured to couple to a portion of the seat pan (such as the seat pan 306 shown in FIG. 3A) via one or more seat pan attachment devices 112. For instance, the one or more seat pan attachment devices 112 may include one or more fasteners 113 configured to couple to one or more holes on one or more portions of the seat pan.

The one or more translation arms 110 may include one or more linear guide rails 118. For example, the first translation arm 110 may include a first guide rail 118 and the second translation arm 110 may include a second guide rail 118.

Figure 1B:
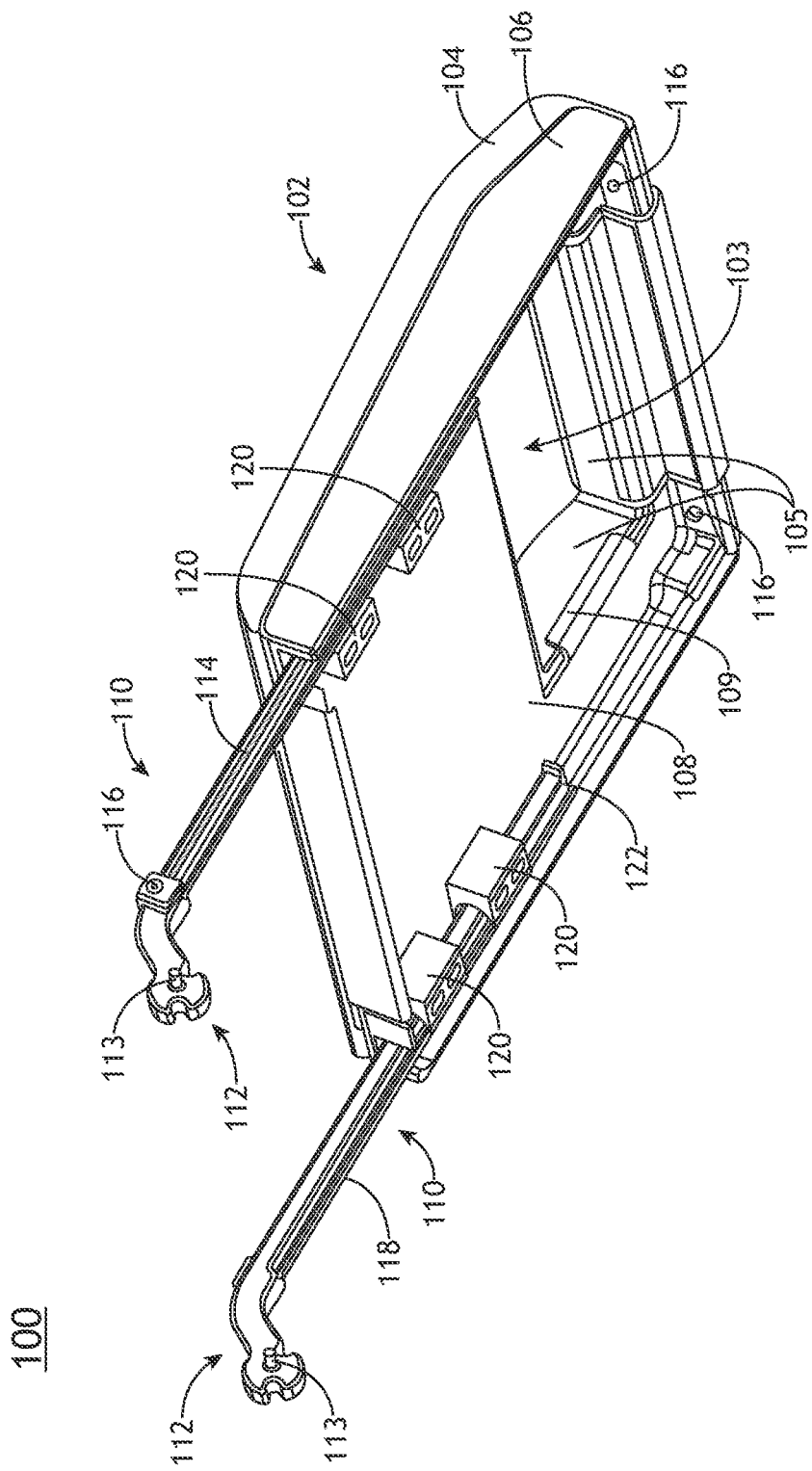
FIG. 1B illustrates a bottom perspective view of the cabin attendant aircraft seat leg rest with foot support, in accordance with one or more embodiments of the disclosure.

The one or more guide rails 118 may be configured to couple to one or more linear bearings 120. For example, the first guide rail 118 may be configured to couple to a first linear bearing 120 and a second linear bearing 120 and the second guide rail 118 may be configured to couple to a third linear bearing 120 and a fourth linear bearing 120. Although FIG. 1B depicts the assembly 100 including a specific number of linear bearings 120, it is noted that the assembly 100 may include any number of linear bearings 120. However, it is noted that the four linear bearings 120 may be configured to prevent chucking of the one or more guide rails 118.

The one or more linear bearings 120 may be configured to engage with the one or more guide rails 118. For example, the one or more linear bearings 120 may be configured to slide along the length of the one or more guide rails 118 when the one or more linear bearings 120 are engaged with the one or more guide rails 118.

The leg rest assembly 100 may include one or more translation devices 114 configured to translate (e.g., slide) the leg rest assembly 100 between one or more leg rest positions. For example, the one or more translation devices 114 may be configured to translate the support sub-assembly 102 between an un-extended position (or default position) and an extended position. For instance, the one or more translation devices 114 may be configured to cause the one or more linear bearings 120 to glide along the one or more guide rails 118, such that the support sub-assembly 102 may translate to the extended position via the one or more translation devices 114 when a force is applied. By way of another example, the one or more translation devices 114 may be configured to translate the support sub-assembly 102 between an extended position and an un-extended position (or default position). For instance, the one or more translation devices 114 may be configured to cause the one or more linear bearings 120 to glide along the one or more guide rails 118, such that the support sub-assembly 102 may translate to the un-extended position via the one or more translation devices 114 when a force is released. In this regard, the one or more translation devices 114 may be configured to auto-retract the support assembly 102 between the extended position and the un-extended position (or default position). It is noted that the support assembly 102 may translate between one or more one or more intermediate positions (e.g., any position between the extended and un-extended position) while translating between the un-extended and extended position, and vice versa.

The one or more translation arms 110 may be configured to couple to the one or more translation devices 114. For example, a first translation arm may be configured to couple to a first translation device and a second translation arm may be configured to couple to a second translation device. In this regard, the one or more translation devices 114 may be configured to adjust a position of the one or more translation arms 110 to cause the support sub-assembly 102 to translate along the length of the one or more translation arms 110. For instance, the one or more translation devices 114 may be configured to cause the one or more linear bearings 120 to glide along the one or more guide rails 118, such that the support sub-assembly 102 may translate via the one or more translation devices 114 when a force is applied/released.

The one or more translation devices 114 may include one or more bungee cords 114. For example, the one or more translation arms 110 may be configured to couple to the one or more bungee cords 114 via one or more bungee clamps 116. For instance, the first translation arm 110 may be configured to couple to a first bungee cord 114 via a first bungee clamp 116 and the second translation arm 110 may be configured to couple to a second bungee cord 114 via a second bungee clamp 116. Further, the panel 108 may be configured to couple to the one or more bungee cords 114 via the one or more bungee clamps 116. For instance, the first bungee cord coupled to the first translation arm may be configured to couple to the panel via a third bungee clamp 116 and the second bungee cord coupled to the second translation arm may be configured to couple to the panel via a fourth bungee clamp 116. In this regard, the one or more bungee clamps 116 may be configured to couple the one or more bungee cords 114 to the leg rest assembly 100 to create tension along the length of the bungee cords 114 to translate the leg rest assembly 100 between the un-extended position and extended position, and vice versa, using the spring force of the bungee cords 114.

It is noted that the force required to translate the one or more translation devices 114 (e.g., bungee cords) may be minimal. For example, only a minimal amount of force may be needed to push out the support sub-assembly 102 with a user's feet/foot. Further, it is noted that the bungee cord may be any length and/or thickness suitable for translating the leg rest assembly 100 with a minimal amount of force and preventing the leg rest assembly 100 from auto-retracting too fast.

It is noted that the one or more translation devices 114 may include any type of translation device suitable for translating the leg rest assembly 100 to between the one or more leg rest positions (e.g., extended position, one or more intermediate positions, and un-extended position). For example, the one or more translation devices 114 may include one or more helical springs. By way of another example, the one or more translation devices 114 may include one or more gas springs.

The one or more guide rails 118 may include one or more travel limiters 122. For example, the one or more guide rails 118 may include one or more travel limiters 122 on a distal end of the one or more guide rails 118 to prevent the one or more linear bearings 120 from disengaging with the one or more guide rails 118. Further, the one or more travel limits 122 may be configured to prevent the bungee cord 114 from exceeding the maximum length of the bungee cord 114, such that the life cycle of the bungee cord 114 is maintained.

Referring generally to FIGS. 2A-2D, the leg rest assembly 100 may be translatable between one or more positions (e.g., extended position, one or more intermediate positions, and/or un-extended/default position). For example, the leg rest assembly 100 may be translatable between the one or more positions (e.g., extended position, one or more intermediate positions, and/or un-extended/default position) when a force (or pressure) is one of applied or not applied to (or released from) the support sub-assembly 102.

Figure 2A:
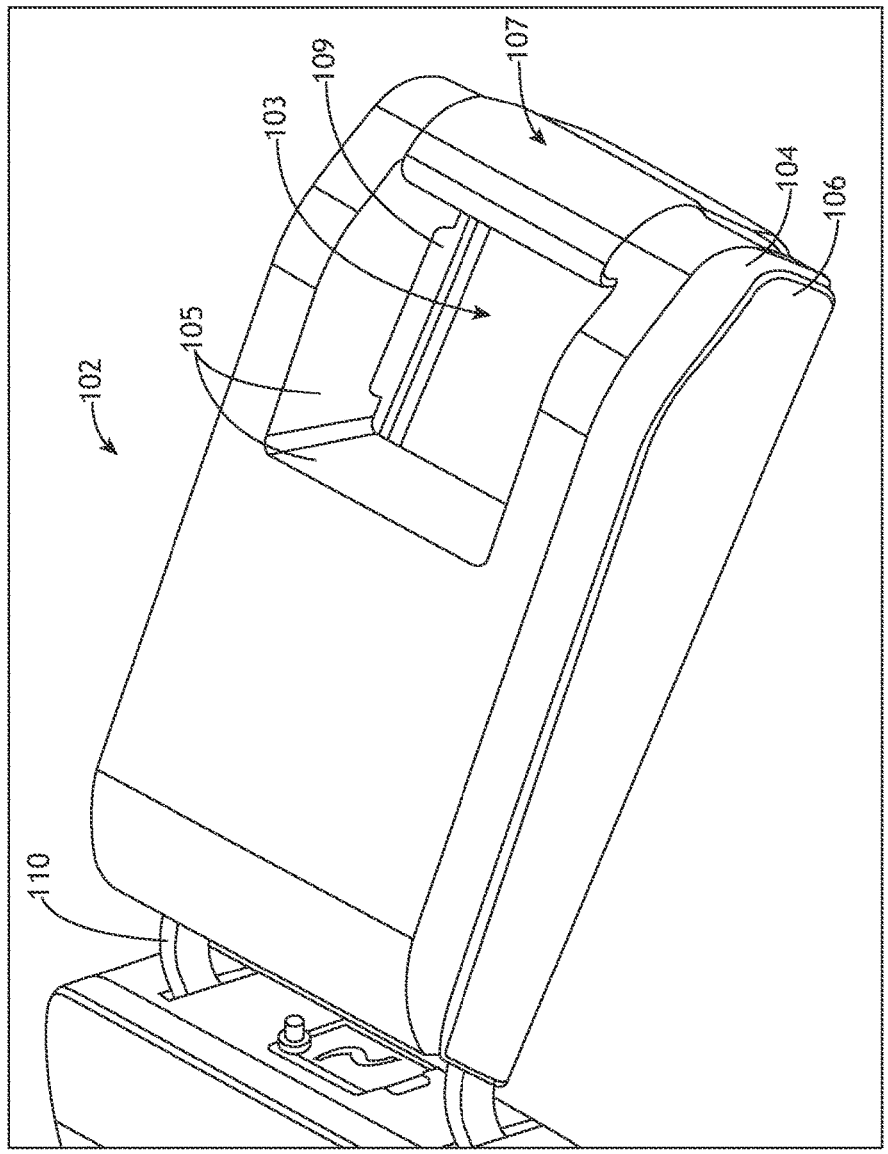
FIG. 2A illustrates a perspective view of the cabin attendant aircraft seat leg rest with foot support in an un-extended position, in accordance with one or more embodiments of the disclosure.
Figure 2B:
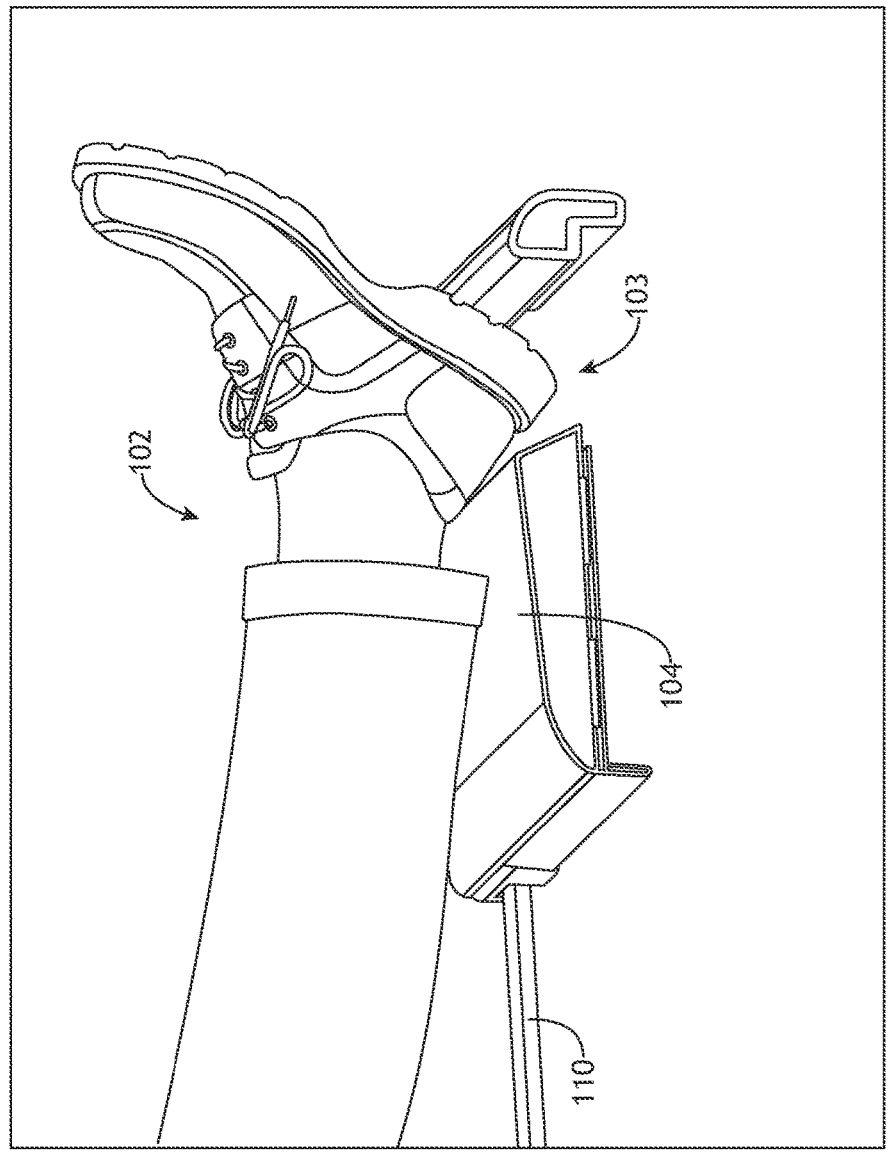
FIG. 2B illustrates a cross-sectional view of the cabin attendant aircraft seat leg rest with foot support in an un-extended position, in accordance with one or more embodiments of the disclosure.

Referring to FIG. 2A, the leg rest assembly 100 may be in an un-extended position (or default position) when no force is applied to the support sub-assembly 102. For example, the one or more translation devices 114 (e.g., the one or more bungee cords 114) may be pre-loaded with a predetermined amount of force to cause the leg rest assembly 100 to be in the un-extended position (or default position) when no force is applied to the support sub-assembly 102. In this regard, the one or more bungee cords 114 may be configured to keep the leg rest assembly 100 in the un-extended position (or default position) via the pre-loaded spring force of the one or more bungee cords 114.

It is noted that when the leg rest assembly 100 is in the un-extended position (or default position), the support sub-assembly 102 may be configured to provide leg support and/or leg and foot support. For example, a portion of the support cushion 104 may be tapered, such that the back of the ankle rests on the tapered portion when a user put their legs on the support cushion and hangs their feet off the end of the support cushion 104.

Further, it is noted that when the leg rest assembly 100 is in the un-extended position (or default position), the one or more translative devices 114 (e.g., bungee cords) may be enclosed by the support sub-assembly 102.

Figure 2C:
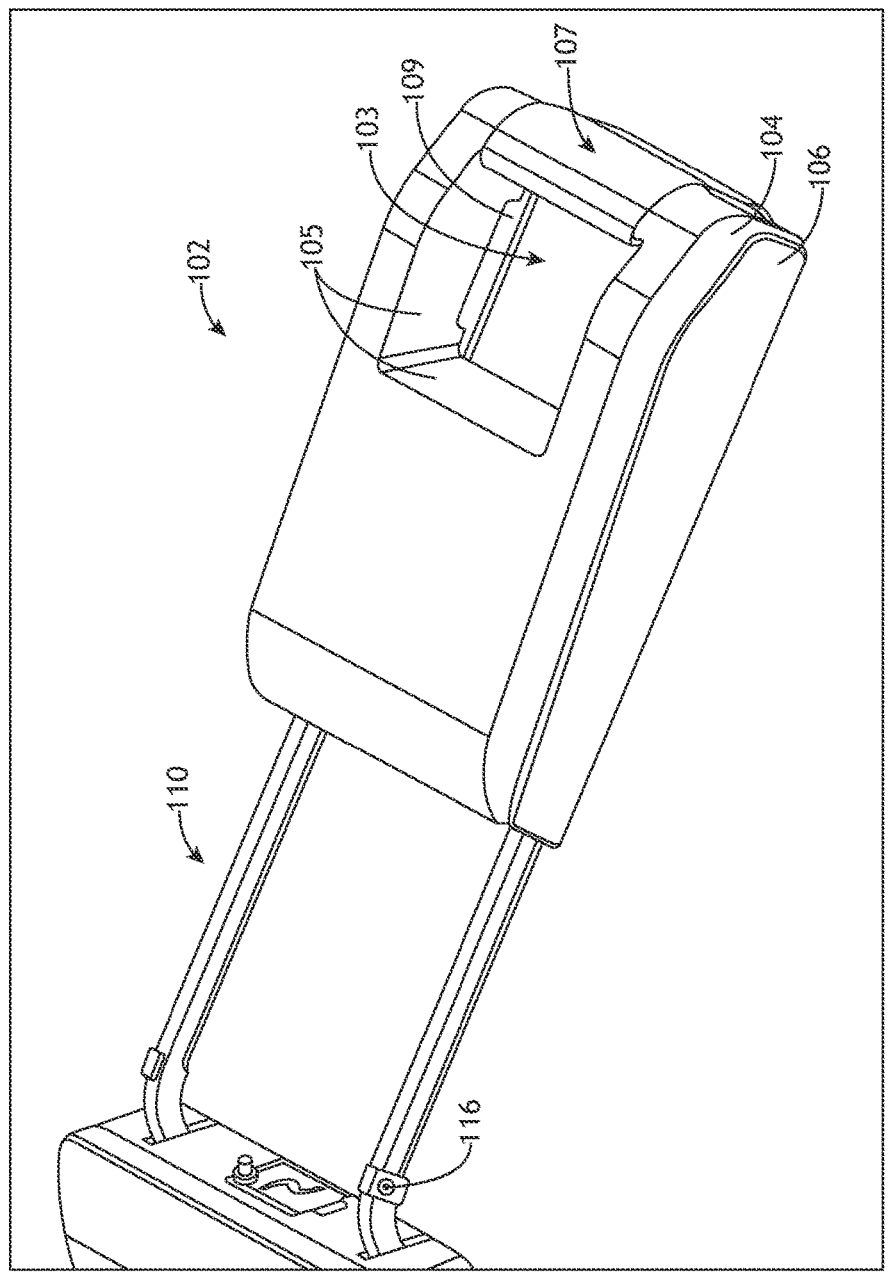
FIG. 2C illustrates a perspective view of the cabin attendant aircraft seat leg rest with foot support in an extended position, in accordance with one or more embodiments of the disclosure.
Figure 2D:
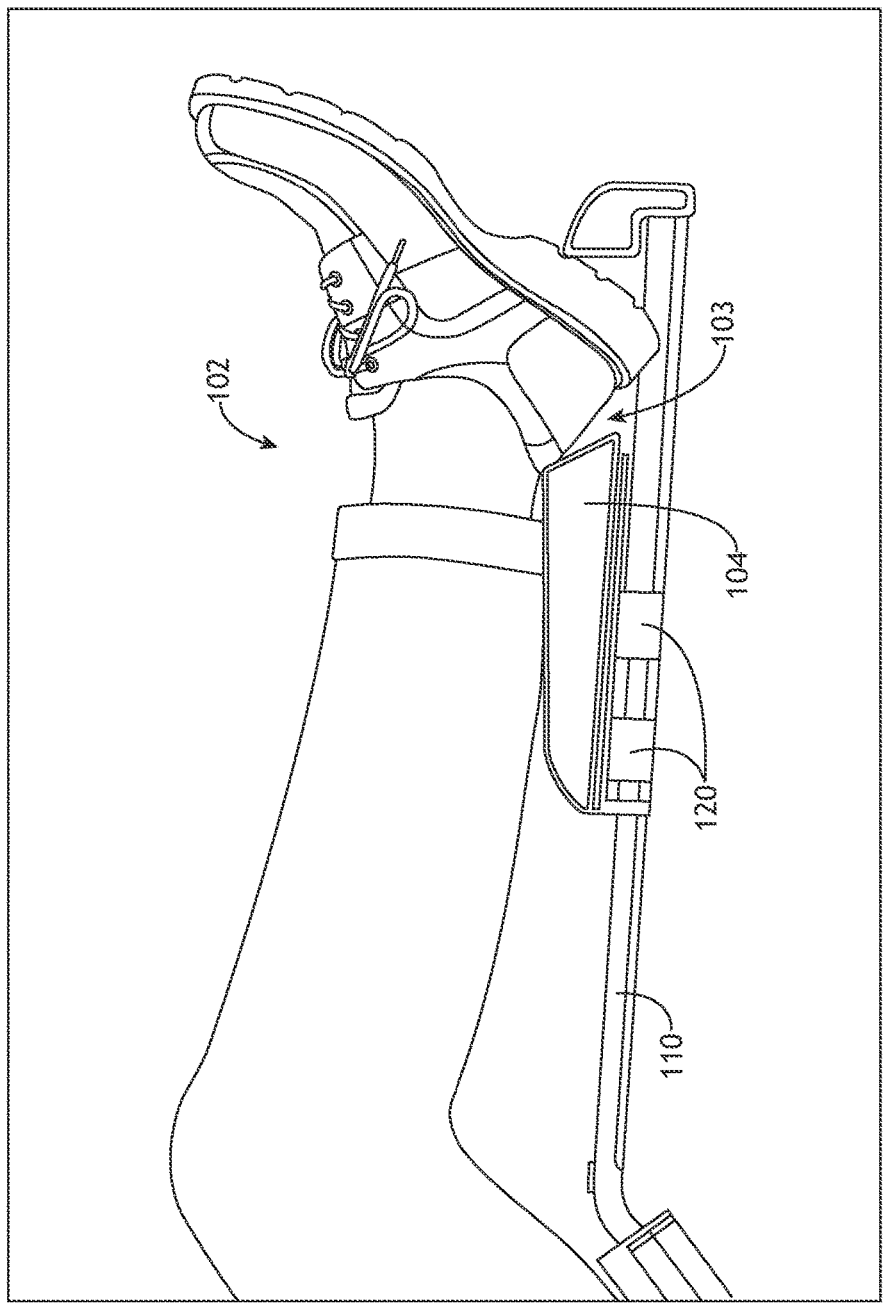
FIG. 2D illustrates a cross-sectional view of the cabin attendant aircraft seat leg rest with foot support in an extended position, in accordance with one or more embodiments of the disclosure.

Referring to FIGS. 2B-2D, the leg rest assembly 100 may be translatable between the un-extended position (or default position) and the extended position when a predetermined amount of force is applied to the support sub-assembly 102. For example, a user's foot/feet may be placed within the cavity 103 and a force may be applied via the user's foot/feet to cause the leg rest assembly 100 to translate between the un-extended position (or default position) and the extended position. For instance, when a user pushes in an outward direction with their foot/feet, the one or more linear bearings 120 may glide (or slide) along the one or more guide rails 118. In this regard, the support sub-assembly 102 may translate as the one or more translation devices 114 (e.g., bungee cords) extend along the length of the one or more translation arms 110 until the one or more linear bearings 120 make contact with the one or more travel limiters 122. Further, the spring force of the one or more translation devices 114 (e.g., bungee cords) may be configured to put a minimal amount of pressure against the user's feet/foot to keep the leg rest assembly 100 in the extended position.

The leg rest assembly 100 may be translatable to one or more intermediate positions. For example, a user's foot/feet may be placed within the cavity 103 and a force may be applied via the user's foot/feet to cause the leg rest assembly 100 to translate between the un-extended position (or default position) and the extended position. For instance, when a user pushes in an outward direction with their foot/feet, the one or more linear bearings 120 may glide (or slide) along the one or more guide rails 118 until the user stops pushing in the outward direction. In this regard, the support sub-assembly 102 may translate as the one or more translation devices 114 (e.g., bungee cords) extend along the length of the one or more translation arms 110 until the user stops pushing in the outward direction. Further, the spring force of the one or more translation devices 114 (e.g., bungee cords) may be configured to put a minimal amount of pressure against the user's feet/foot to keep the leg rest assembly 100 in the intermediate position.

The leg rest assembly 100 may be translatable between the extended position and the un-extended position (or default position) when a force (or pressure) is not applied to (or released from) the support sub-assembly 102. For example, the leg rest assembly 100 may be retracted when pressure is released from the support sub-assembly. For instance, a user may release pressure by removing their feet/foot from the cavity 103, such that pressure is released from the support sub-assembly 102. In this regard, the one or more translation devices 114 may be configured to automatically retract (auto-retract) to the un-extended position (or default position). It is noted that auto-retraction of the leg rest assembly 100 may prevent the leg rest assembly 100 from interfering with one or more components of the seat assembly (e.g., seat assembly 300 shown in FIGS. 3A-3B) when in the stowed position.

Although FIGS. 2A-2D illustrate the leg rest assembly 100 in one or more positions, the leg rest assembly 100 may be configured to assume an infinite number of positions between the un-extended position and fully extended position. Further, it is noted that the extended position may have any distance of travel. For example, when fully extended, the leg rest assembly 100 may travel 8.00 inches.

FIGS. 3A-3B in general illustrate a cabin attendant aircraft seat assembly 300, in accordance with one or more embodiments of the disclosure. It is noted "cabin attendant aircraft seat assembly 300" and variants of the term including, but not limited to, "aircraft seat assembly 300" or "seat assembly 300" may be considered equivalent, for purposes of the disclosure.

The seat assembly 300 may include a frame 302. The frame 302 may be couplable to an interior structure in an aircraft cabin. The frame 302 may be couplable to a floor in the aircraft cabin.

A cabin attendant aircraft seat 304 may be coupled to the frame 302. It is noted "cabin attendant aircraft seat 304" and variants of the term including, but not limited to, "aircraft seat 304" or "seat 304" may be considered equivalent, for purposes of the disclosure.

The aircraft seat 304 may be a single-occupant seat or a double-occupant seat. The aircraft seat 304 may include a seat pan and cushion 306, a seatback and cushion 308, and a head rest 310. At least a portion of the aircraft seat 304 may fit within a cavity 312 of the frame 302. For example, the seatback and cushion 308 and a portion of the seat pan and cushion 306 may fit within the cavity 312 of the frame 302. It is noted, however, additional portions or the entire aircraft seat 304 may fit within the cavity 312 in the frame 302.

The aircraft seat 304 may be rotatable about an axis (e.g., swivelable) or translatable (e.g., trackable or slidable). The aircraft seat 304 may be rotatable about an axis cross-wise in the aircraft seat 304 into a position including, but not limited to, a stowed position or one or more deployed positions. The aircraft seat 304 may be fully positionable between the outer limits of motion as defined by the moveable components of the aircraft seat 304. Where the aircraft seat 304 is installed within an aisle, a walkway, a galley, and/or an entrance to/egress from the aircraft, the aircraft seat 304 may be fully positionable between the outer limits of motion as defined by surrounding interior structures within the aisle, the walkway, the galley, and/or the entrance to/egress from the aircraft. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted herein that any position that does not meet the above-defined requirements of the TTL position may be considered a non-TTL position, for purposes of the present disclosure. Further, it is noted the aircraft seat 304 may be actuatable (e.g., translatable and/or rotatable) from the TTL position to a non-TTL position, and/or vice versa. Further, it is noted the aircraft seat 304 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

The seat assembly 300 may include one or more armrests 314. The one or more armrests 314 may be actuatable between a stowed position and a deployed position.

Although not shown in FIGS. 3A-3B, the frame 302 may include a storage compartment. The one or more storage compartments may be configured to receive and hold medical supplies, medical devices, medical tools, or the like. The one or more storage compartments may include one or more safety devices (e.g., air masks, personal floatation devices, or the like).

The one or more storage compartments may include a storage compartment configured to receive luggage or other belongings of the cabin attendant.

The one or more storage compartments may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, bassinets, blankets, or the like.

The one or more storage compartments may include one or more electronic connections for one or more passenger amenities such as, but not limited to, one or more charging ports, one or more charging cables, or the like.

The one or more storage compartments may include one or more electronic connections in communication with one or more components of the suite such as, but not limited to, one or more display device connection ports, one or more display device connection cables, one or more audio output jacks (e.g., headphone jacks), one or more audio input jacks, or the like.

Although embodiments of the disclosure illustrate the leg rest and foot support assembly 100 being used with a cabin attendant aircraft seat assembly 300 installed within an aircraft cabin, it is noted herein, the leg rest and foot support assembly 100 and/or components of the leg rest and foot support assembly 100 are not limited to the aviation environment and/or the aircraft components within the aviation environment. For example, the leg rest and foot support assembly 100 and/or components of the leg rest and foot support assembly 100 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the leg rest and foot support assembly 100 and/or components of the leg rest and foot support assembly 100 may be configured for commercial or industrial use in either a home or a business. Therefore, the above description should not be interpreted as a limitation on the present disclosure but merely an illustration. it is noted herein, the leg rest and foot support assembly 100 and/or components of the leg rest and foot support assembly 100 are not limited to the aviation environment and/or the aircraft components within the aviation environment. For example, the leg rest and foot support assembly 100 and/or components of the leg rest and foot support assembly 100 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the leg rest and foot support assembly 100 and/or components of the leg rest and foot support assembly 100 may be configured for commercial or industrial use in either a home or a business. Therefore, the above description should not be interpreted as a limitation on the present disclosure but merely an illustration.

Further, it is noted herein, the leg rest and foot support assembly 100 and/or components of the leg rest and foot support assembly 100 are not limited to being used with a cabin attendant aircraft seat assembly 300. For example, the leg rest and foot support assembly 100 and/or components of the leg rest and foot support assembly 100 may be configured for any type of aircraft seat including, but not limited to, a business class or first-class passenger seat, an economy-class passenger seat, or the like.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A cabin attendant aircraft seat comprising:
    a support system including a seatback frame and a seat pan frame;
    a seat pan cover including at least one surface configured to conform to a corresponding surface of the support system;
    a seatback cover including at least one surface configured to conform to a corresponding surface of the support system; and
    a leg rest with foot support assembly configured to couple to a portion of the seat pan frame, the leg rest with foot support assembly comprising:
        a support sub-assembly configured to provide at least one of leg support or foot support, the support sub-assembly comprising:
            a panel; and
            a support cushion, the support cushion configured to couple to a portion of the panel, the support cushion including a cavity defined by one or more surfaces of the support cushion, wherein the cavity of the support cushion is configured to receive a portion of a user's foot to translate the leg rest with foot support assembly; and
        a translation sub-assembly configured to translate the leg rest with foot support assembly between a first position and one or more additional positions, the translation sub-assembly comprising:
            one or more translation arms configured to couple to one or more portions of the support sub-assembly, the one or more translation arms further configured to couple to one or more portions of the seat pan frame;
            one or more guide rails configured to couple to the one or more translation arms;
            one or more linear bearings configured to engage with the one or more guide rails, the one or more linear bearings slideable along a length of the one or more guide rails; and
            one or more translation devices configured to translate the support sub-assembly between the first position and the one or more additional positions when the one or more linear bearings slide along the length of the one or more guide rails.

2. The cabin attendant aircraft seat of claim 1, wherein the panel includes one or more flanges, the one or more flanges configured to couple to one or more portions of the support cushion to align the support cushion with the panel.

3. The cabin attendant aircraft seat of claim 1, wherein the support sub-assembly further comprises:
    one or more side caps.

4. The cabin attendant aircraft seat of claim 1, wherein at least one of the one or more surfaces of the support cushion is angled.

5. The cabin attendant aircraft seat of claim 1, wherein the support sub-assembly further comprises:
    a rub strip configured to reversibly couple to a portion of the support cushion.

6. The cabin attendant aircraft seat of claim 1, wherein the one or more translation devices includes one or more bungee cords.

7. The cabin attendant aircraft seat of claim 6, wherein the translation sub-assembly further comprises:
    a plurality of bungee clamps configured to couple the one or more bungee cords to the leg rest with foot support assembly.

8. The cabin attendant aircraft seat of claim 7, wherein the plurality of bungee clamps include a first set of one or more bungee cords configured to couple the one or more bungee cords to one or more portions of the support sub-assembly, the plurality of bungee clamps further include a second set of one or more bungee cords configured to couple the one or more bungee cords to one or more portions of the translation sub-assembly.

9. The cabin attendant aircraft seat of claim 1, wherein the one or more guide rails include one or more travel limiters, the one or more travel limiters configured to prevent the one or more linear bearings from disengaging with the one or more guide rails.

10. The cabin attendant aircraft seat of claim 1, wherein the one or more translation devices are configured to stow the leg rest in the first position, the first position including an un-extended position.

11. The cabin attendant aircraft seat of claim 1, wherein the support sub-assembly is configured to translate between the first position and the one or more additional positions when pressure is applied by the user's foot in a direction outward from the cavity of the support cushion.

12. The cabin attendant aircraft seat of claim 11, wherein the first position includes an un-extended position, the one or more additional positions including one of an extended position or one or more intermediate positions.

13. The cabin attendant aircraft seat of claim 11, wherein the support sub-assembly is configured to automatically retract to the first position when pressure is released from the cavity of the support cushion, the first position including an un-extended position.

14. A leg rest with foot support assembly comprising:
a support sub-assembly configured to provide at least one of leg support or foot support, the support sub-assembly comprising:
a panel; and
a support cushion, the support cushion configured to couple to a portion of the panel, the support cushion including a cavity defined by one or more surfaces of the support cushion, wherein the cavity of the support cushion is configured to receive a portion of a user's foot to translate the leg rest with foot support assembly; and
a translation sub-assembly configured to translate the support sub-assembly between a first position and one or more additional positions, the translation sub-assembly comprising:
one or more translation arms configured to couple to one or more portions of the support sub-assembly, the one or more translation arms further configured to couple to one or more portions of a seat pan frame of an aircraft seat;
one or more guide rails configured to couple to the one or more translation arms;
one or more linear bearings configured to engage with the one or more guide rails, the one or more linear bearings slideable along a length of the one or more guide rails; and
one or more translation devices configured to translate the support sub-assembly between the first position and the one or more additional positions when the one or more linear bearings slide along the length of the one or more guide rails.

\* \* \* \* \*